United States Patent [19]

Cailliot

[11] 4,074,621

[45] Feb. 21, 1978

[54] INFUSION-MAKING MACHINE

[75] Inventor: Serge Leon Louis Cailliot, Neuilly-sur-Seine, France

[73] Assignees: Societe Normande de Services, Colombes; Anvar Agence Nationale de Valorisation de la Recherche, Neuilly-sur-Seine; Societe Generale pour le Financement de l'Innovation Soginnove, Paris; Bertrand Cor, Paris; Arnaud Gastinne, Paris, all of France; part interest to each

[21] Appl. No.: 694,939

[22] Filed: June 11, 1976

[30] Foreign Application Priority Data

June 13, 1975 France .................................. 75 18665
Feb. 26, 1976 France .................................. 76 05377

[51] Int. Cl.² .................. A47J 31/22; A47J 31/24; A47J 31/42
[52] U.S. Cl. ......................................... 99/286; 99/287; 99/289 R; 99/304; 99/302 C

[58] Field of Search ............... 99/286, 287, 289 R, 99/289 D, 302 R, 302 C, 283; 222/129, 129.1

[56] References Cited

U.S. PATENT DOCUMENTS

| 1,789,334 | 1/1931 | Englung | 99/286 |
| 1,869,720 | 8/1932 | Strand | 99/283 |
| 2,422,944 | 6/1947 | Bogoslowsky | 99/286 |
| 2,589,222 | 3/1952 | Burgess | 99/289 |
| 3,153,377 | 10/1964 | Bosak | 99/286 |
| 3,233,535 | 2/1966 | Fowlie | 99/302 C |

Primary Examiner—Robert W. Jenkins
Attorney, Agent, or Firm—Brisebois & Kruger

[57] ABSTRACT

Novel infusion-making machine characterized by a filter consisting of superposed crowns located in a centrifuging chamber eccentric with respect to a central shaft rotated by a motor, and submitted to a compound motion. The adjustments of the crowns permits infusing and filtering over a broad range so that the machine may be used in a variety of applications.

20 Claims, 11 Drawing Figures

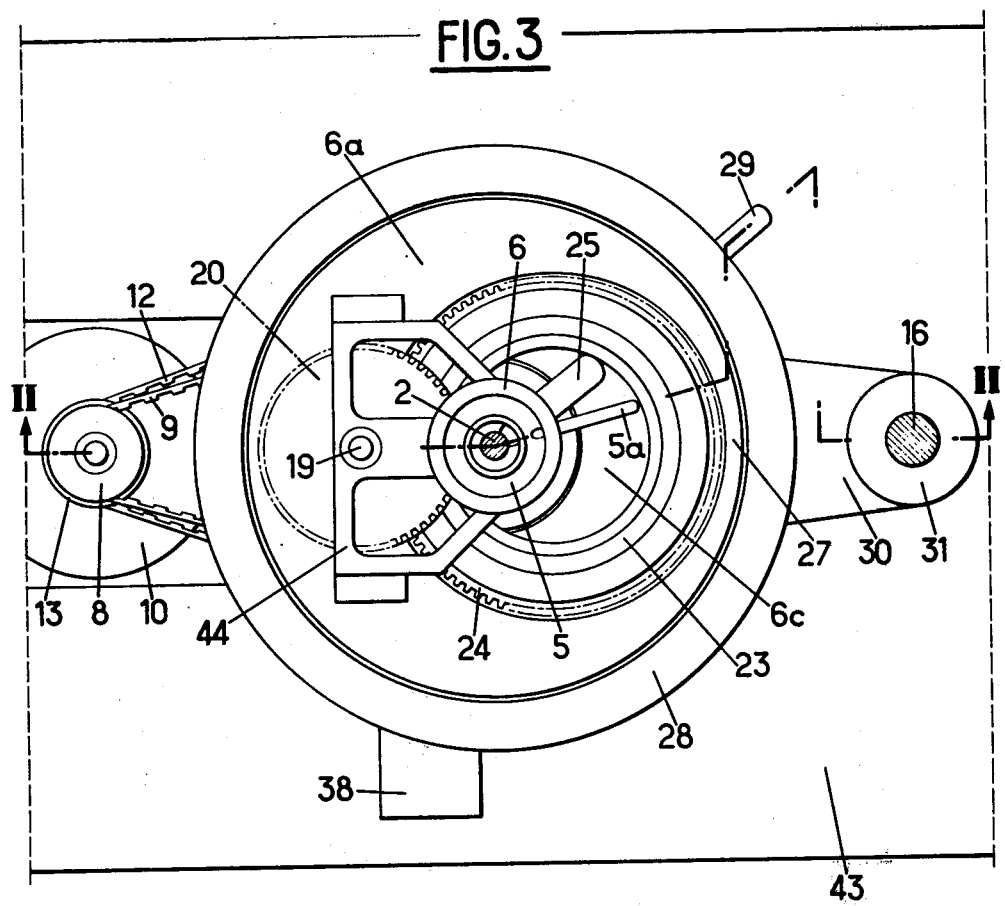
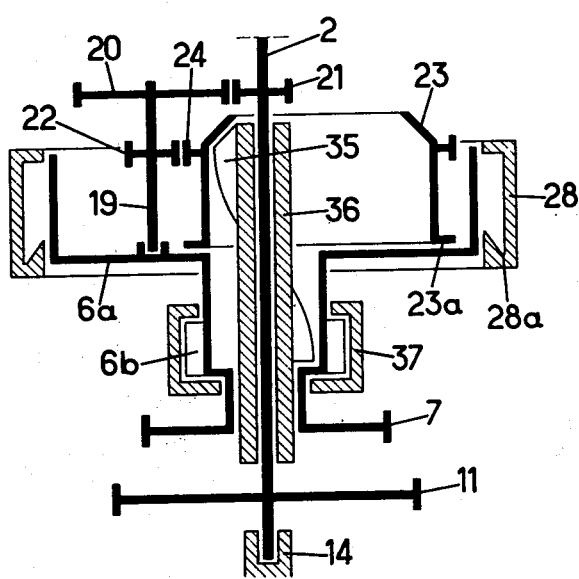

INFUSION-MAKING MACHINE

SUMMARY OF THE INVENTION

It is known in the art to use centrifugal force to separate an infusion of coffee, or other material, obtained in a chamber rotating at high speed from the residue from which the essence has been removed that was contained in the original material previously introduced in said chamber.

Various filtering systems have been provided to prevent said residue from being dragged along by said infusion, but it is known that only a small number of these filtering systems successfully resists progressive clogging or fouling of the walls of the infusion chambers.

Furthermore, the infusion machines made to date by means of centrifugal force operate discontinuously, allowing the preparation only a restricted time of infusion corresponding to definite quantities of boiling water and of original material which are admitted into said centrifuging chamber. These infusion machines generally comprise systems for ejecting the residue when all of the infusion obtained with a definite quantity of boiling water has been collected at the exhaust of this centrifuging chamber, for instance in one of several cups, this residue being located at a level different from that where said infusion is expelled, before new amounts of boiling water and original material are admitted into said chamber.

The object of the present invention is a wholly automatic infusion machine also making use of centrifugal force but so designed that the infusion, the filtration, the drying and the expulsion of the residue occur simultaneously and in continuous operation.

The new machine may be provided with an integrated grinder located above said centrifuging chamber, this grinder using a grinding screw which constitutes the upper part of its central shaft of rotation.

In any event, this new machine is provided with two transmission systems driven by the same motor and in turn driving at different but related speeds said central shaft and an element supporting said centrifuging chamber.

When the above machine does not include an integrated grinder, the upper part of said central shaft advantageously consists of a screw ensuring the supply of original material to said centrifuging chamber.

If desired or appropriate, this new infusion machine can be set to make a product cup by cup, or it may fill several cups simultaneously provided its time of operation is accordingly modified.

Said continuous operation has been made possible by providing a centrifuging chamber which is eccentric with respect to said central shaft, and by imparting to said chamber a compound motion obtained by driving at high angular speed close to that of the central shaft a planetary gear supporting said eccentric chamber, and furthermore imparting to said chamber a second rotation about its main shaft with respect to this planetary gearing, preferably in the opposite direction, by means of a gear speed-reducer, this second motion being of reduced angular speed and depending linearly on the respective angular speeds of said central shaft and said planetary gear.

This compound motion makes available a large centrifugal force for expelling the infusion and furthermore permits both centrifugal drying of the grounds in a continuous manner and their ultimate return to the vicinity of a fixed part surrounding said central shaft in the course of a centripetal motion with respect to said shaft.

The residue being constantly forced against the inside wall of the circumferential filter seated inside said centrifuging chamber by centrifugal force is subjected to the continuous action of a scraper solidly and rigidly connected to said planetary gear, so that the strongly tamped residue is detached and returned to fixed elements with a steep slope, for instance strongly inclined helical ramps, the residue dropping by gravity to an expulsion turbine provided at a lower level, whereby the residue is sent through an appropriate conduit to a suitable collecting vessel.

Another significant characteristic of the new infusion machine of the present invention consists in the conception and design of its filter, namely the super-position of annular crowns of appropriate cross-section seated inside said centrifuging chamber and operating in concert with adjacent annular crowns along contact surfaces of small radial thickness.

Furthermore, the circumferential wall of this centrifuging chamber, which is preferably bounded by equidistant posts surrounding said filter and as a whole connecting the cover of said chamber to a lower fastening collar on said planetary gear, is of a very slightly conical shape which allows very slight displacements of said contact surfaces with respect to one another under the influence of the centrifugal force, these relative displacements of very low amplitudes being sufficient to ensure a constant self-cleaning of said contact surfaces during expulsion of the infusion between these surfaces, but being insufficient to allow this infusion to carry away the residue.

For simplicity of assembly of said filter inside said chamber, the chamber's diameter is a maximum at its upper part in the vicinity of a toothed crown which provides rotational speed reduction means.

Because of this constant self-cleaning, continuous operation may be obtained for virtually indefinite durations without clogging of the filter.

It is therefore easily understood that the infusion having passed through said filter may easily and freely pass between said connecting posts.

The above filter also may comprise certain improvements regarding the distribution of the clearance between the superposed crowns of said filter and the control in precise manner of this clearance while ensuring perfect horizontality of said superposed crowns and a minimum clearance in the vertical direction.

Furthermore other improvements in these superposed crowns permit improved self-cleaning, in particular when these filters are used for other applications, by providing the adjacent crowns with essentially epicycloidal motions of different respective amplitudes that enhance this self-cleaning.

The first of the above results is obtained in particular by providing bosses at the upper part of said crowns and from place to place in the shape of stairways, on the outside bevelled part of these crowns, the upper horizontal part of those bosses extending the upper horizontal slices of reduced width of said crowns which permit relatively larger displacements of the adjacent crowns superposed one on another so as to provide between the horizontal sides of these crowns and in the gaps separating the bosses a reduced clearance permitting transmission of the filtrate, the magnitude of this clearance depending on the internal conicity, more or less pronounced, of the connecting posts of the centrifuging chamber that constitute said filter, said crowns on the other hand stopping the solid particles exceeding in size those of the slight clearances.

The other result is achieved by roughening the co-functioning surfaces between the crowns and said connecting posts and by maximum buffing on the other hand said horizontal slabs and co-functioning surfaces between said slabs and said bosses.

In particular as regards different filter applications, for instance when filtering suspensions of various materials, three different parameters are available which may be acted upon independently one from the other, depending on the nature of the suspensions that are to be filtered, and on the particle dimensions in these suspensions.

Depending on how steeply inclined the connecting pillars are set at the factory with respect to the vertical, more or less pronounced filtering may be obtained, the clearances between adjacent crowns becoming nil just a little before said pillars become vertical — the moment the horizontal sides of those neighboring crowns begin to permanently straddle one another during said epicycloidal motions.

However this variable slope may be adjusted as a function of the more or less pronounced speed of rotation of the planetary gear determining the expulsion of the filtrate, some larger particles being more easily carried away for the same clearance between superposed and neighboring crowns if this speed of rotation is markedly increased.

Again the gear-ratios may be modified at the factory in order to optimally adjust the speed of rotation of the filter as a function of the rate of expulsion of the filtrate so as to vary the filter output as a function of the kind of suspension to be filtered while maintaining a constant density of solid particles corresponding to said suspension inside the filter.

Again it is feasible to make available to the user independent means to allow arbitrary variation of either the two above-cited speeds of rotation of the planetary gear and filter or the slope of the posts of said filter, as will be explained further below.

The characteristics of the present invention will be more easily understood by reading the description below which illustrates an embodiment of the new infusion machine of the present invention which is provided merely for illustration and without thereby implying any limitation, said embodiment being described in reference to the attached drawing, which shows:

FIG. 3 is a top view of the same machine along arrow III of FIG. 2 following removal of the fixed grinding enclosure of the grinder integrated in the upper part of this machine;

Figure 2:
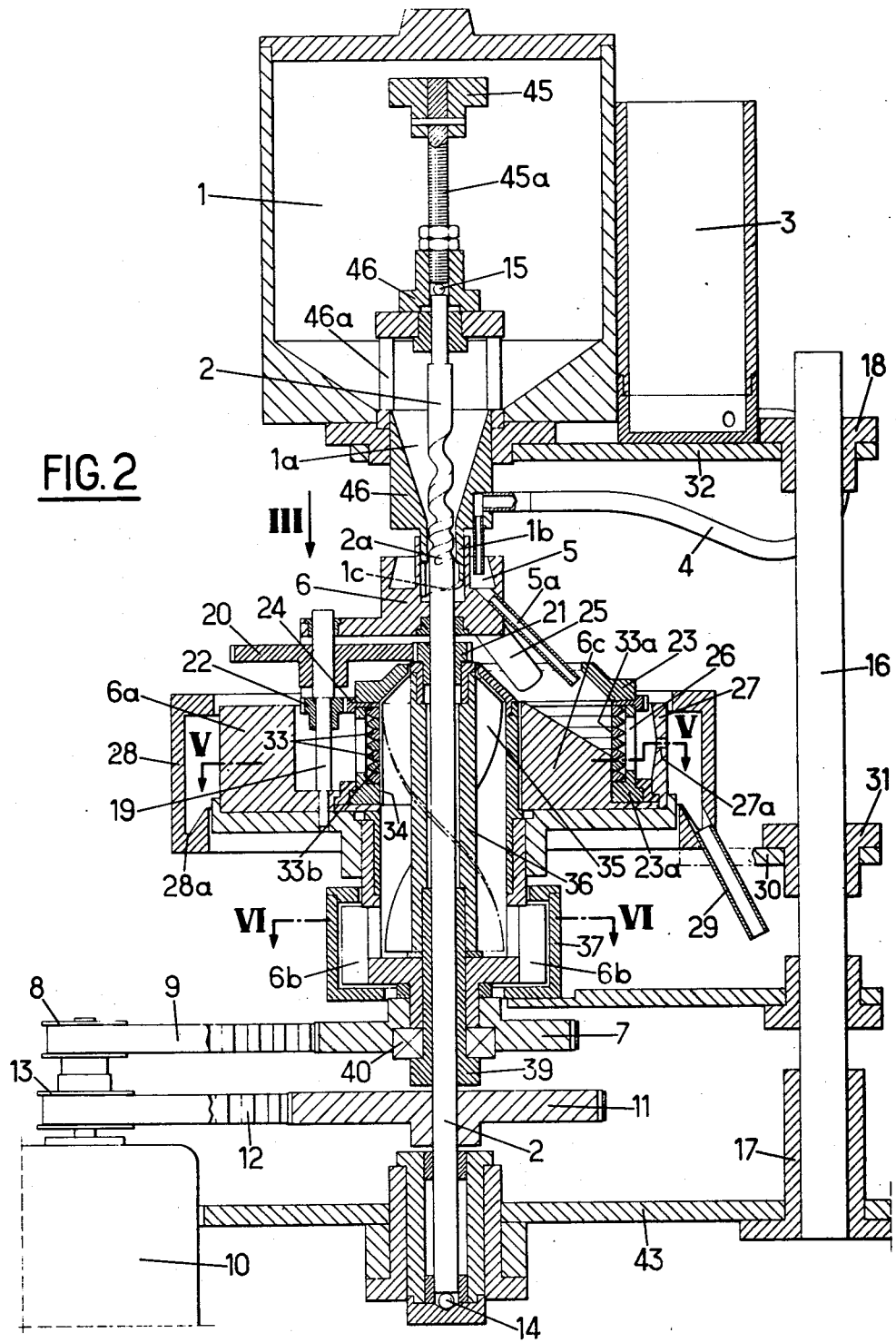
FIG. 2 is a sectional view of said machine along line II—II of FIG. 3, through the axis of said drive motor.
Figure 5:
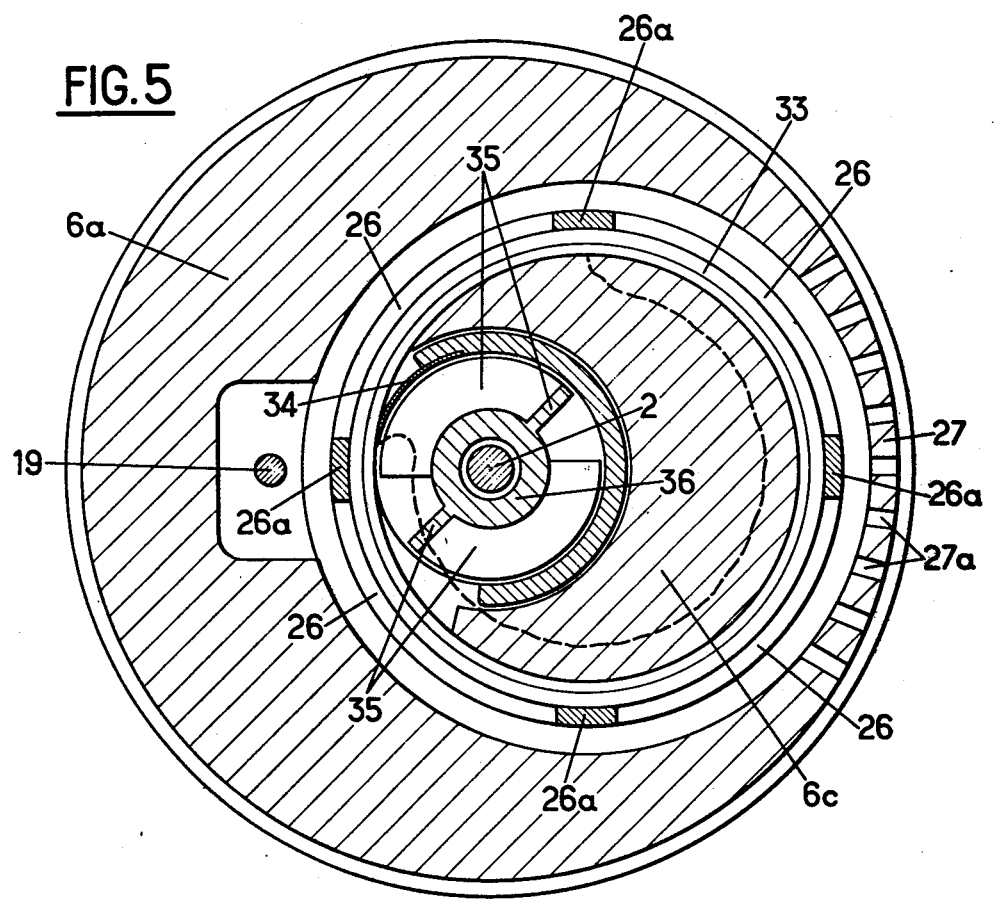
Figure 6:
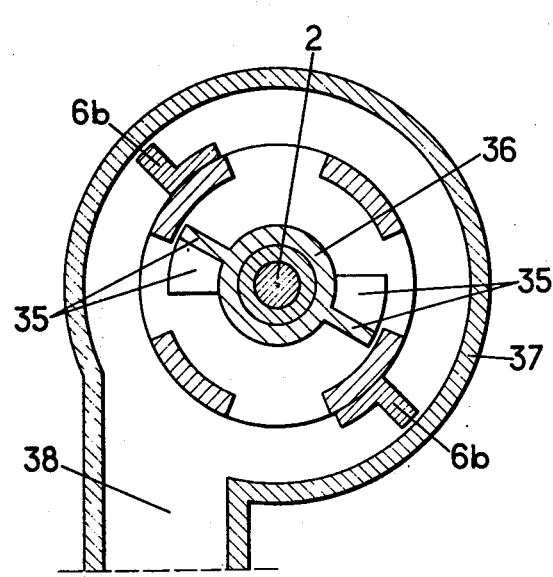
Figure 7:
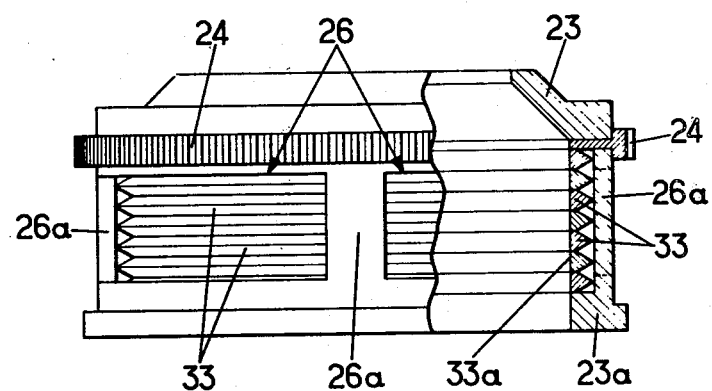
Figure 8:
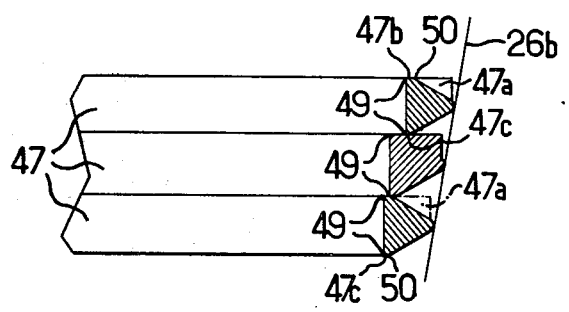
Figure 9:
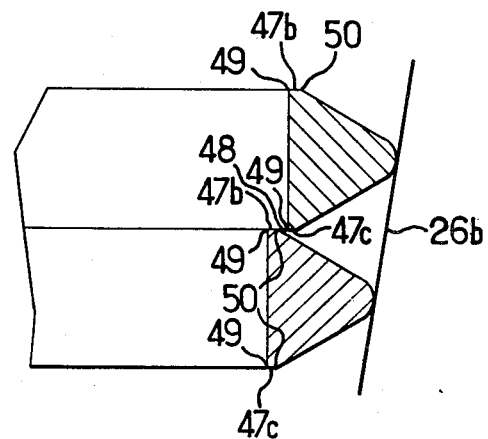
Figure 10:
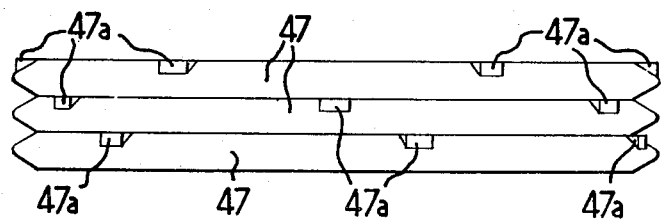
Figure 11:
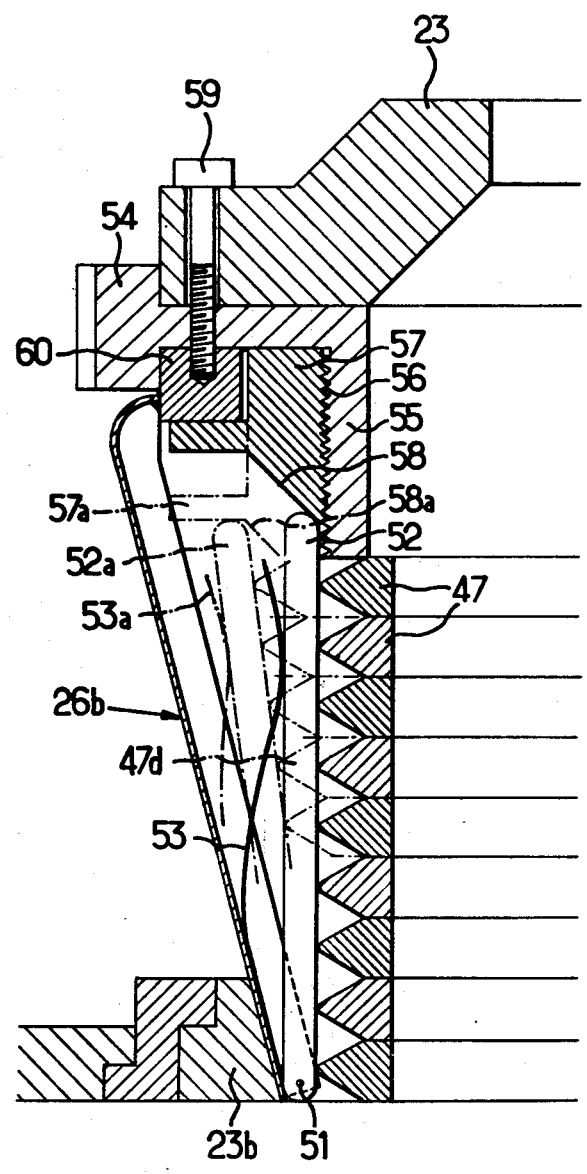

FIG. 4 diagrammatically shows the drive system for the various moving parts of said infusion machine;

FIG. 5 is a horizontal cross-section of said machine at the level of its centrifuging chamber, along V—V of FIG. 2;

FIG. 6 is a horizontal cross-section of the same machine at the level of its residue ejection turbine, along VI—VI of FIG. 2;

FIG. 7 is an outside elevation in fragmentary form of said centrifuging chamber and filter;

FIG. 8 is a partial diametrical cross-section of said filter showing three bosses respectively provided on three superposed crowns, in the plane of the section, in front and to the rear of it;

FIG. 9 is a partial cross-section of the same filter through a diametric plane passing through a gap between neighboring bosses showing the clearance between the horizontal sides of two adjacent crowns, there being appreciable sloping of said connecting posts;

FIG. 10 is a partial outside elevation of three superposed crowns of said filter, showing the bosses in the shape of stairway provided from place to place at the upper part of said crowns; and FIG. 11 is a diagrammatic elevation of a system allowing variation in the slope of said connecting posts.

Figure 1:
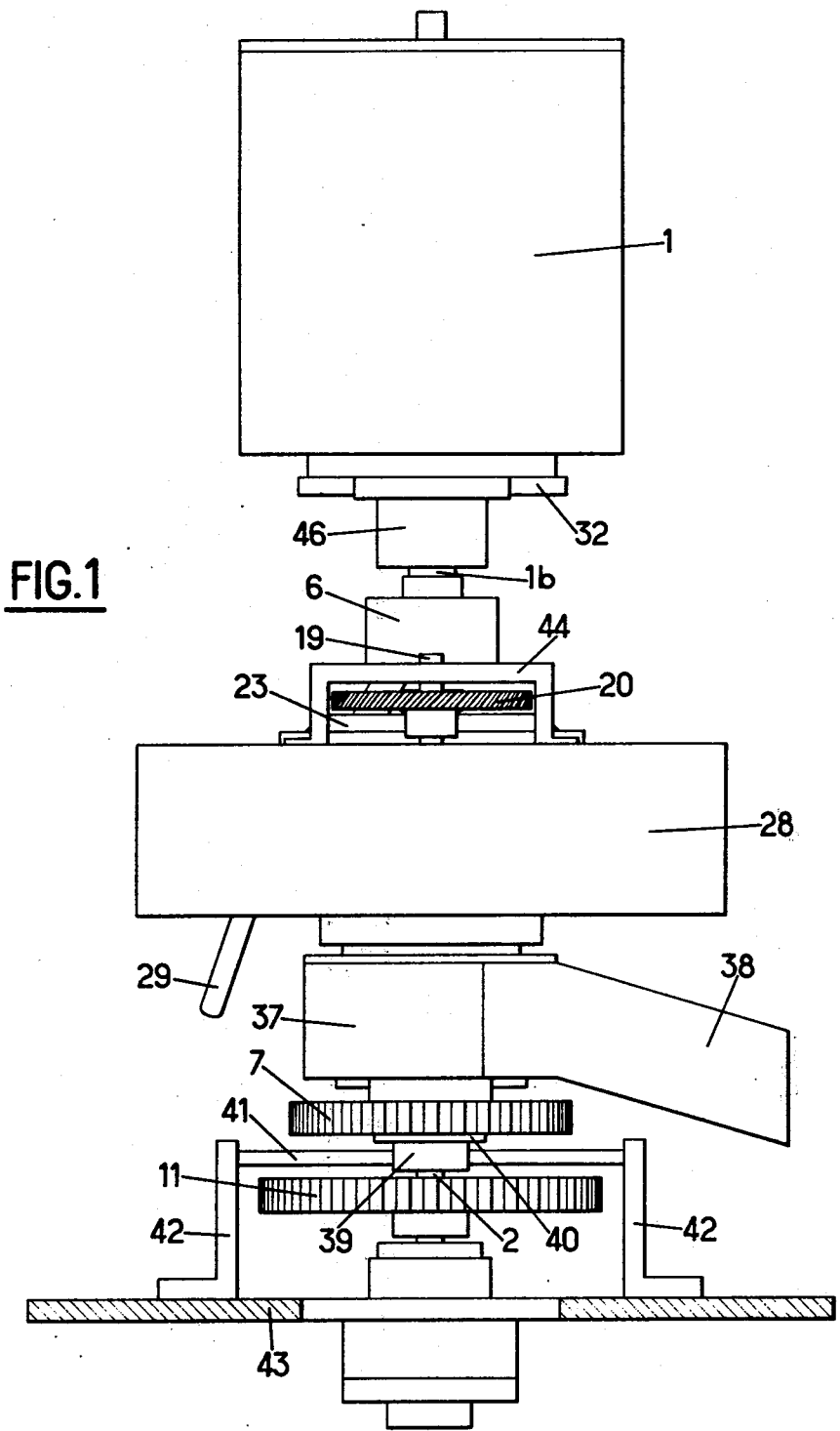
FIG. 1 is an outside elevation of an infusion machine of the invention, shown without its motor and drive belt for the moving parts.

FIGS. 1 and 2 show a supply funnel 1 including a truncated-cone grinding enclosure 1a of which the diameter decreases downwards and of which the horizontal cross-sections may be essentially elliptic at their maximum dimensions, and possibly forming two lobes separated by two ridges with curved blanks seated near the minimum dimension and facilitating the descent of the original material acted on by gravity and tending to descend toward the lower part of said enclosure to be ground there by grinding screw 2 shown in FIG. 2, said screw being of decreasing pitch downward and of downward decreasing flute depth, said pitch and said flute depth becoming zero at the lower end 2a of said grinding screw.

A supply container 3 for boiling water is located at the level of the supply funnel 1 of said grinding enclosure, said boiling water passing through a flexible channel 4 and a circular drain 5 of outside truncated-cone cross-section with a downward increasing diameter, this drain being fashioned in the upper part of a planetary gear 6, 6a, 6b which is made to rotate at high speed through the intermediary of two pinions 7 and 8 and of a notched transmission belt 9 imparting to pinion 7 the rotary motion of the shaft of motor 10, also providing the driven rotation of said central shaft.

The upward narrowing shape of said drain 5 prevents the water subjected to the centrifugal force from being projected upward from said drain, whereby the water is allowed to continuously descend through centrifugal force into the inside of said centrifuging chamber 23 by means of downward sloping tube 5a.

Motor 10 also drives a pinion 11 at high speed by means of a notched belt 12 and a pinion 13 keyed to its shaft.

Pinion 11 is solidly and rigidly connected to drive central shaft 2, which is held at its two ends by ball-bearing stops 14 and 15 between two fixed and distinct parts of said machine, said parts being held fixed with respect to each other by an eccentric column 16 and by locking collars 17 and 18.

The grinding screw fastened to shaft 2 and planetary gear 6, 6a, 6b are driven in this manner at high angular speeds close to each other.

The above-mentioned planetary gear through its rotation also drives a shaft 19 solidly and rigidly fixed to a reducing pinion 20 meshing with a pinion 21 which is rigidly and solidly connected to said shaft 2.

Because of the difference in angular speeds of the grinding screw and of said planetary gear, pinion 20 and shaft 19 are driven into rotation and in turn drive another reducing pinion 22 which transmits a reduced-speed rotation to a centrifuging chamber 23 that will be described in further detail with respect to FIG. 7 by means of a circumferentially toothed crown 24.

Centrifuging chamber 23 with a shaft eccentric with respect to that of screw 2 is driven in this manner by the planetary gear to rotate at very reduced speed about its eccentric shaft, this speed being of the order of one thousandth of those of said grinding screw and said planetary gear.

Centrifuging chamber 23 is located inside a cavity in said planetary gearing and therefore is subjected to a compound motion due to the very high speed of rotation of this planetary gearing and to a reduced speed of said centrifuging chamber about its shaft with respect to said planetary gear.

The center part 6a of the planetary gear holds a cavity on the inside which houses said centrifuging chamber 23 and also shaft 19 and control pinion 22 for said centrifuging chamber, and further comprises a conical boss 6c which is rigidly and solidly connected to said planetary gear and of which the axis coincides appreciably with that of the centrifuging chamber, its upper part 6 holding the water supply tube 5a and an original material supply conduit 25 from the lower part of the grinding enclosure 1b and terminating at its bottom into a helical ramp 1c forcing the original material driven into rotation by said upper part of the planetary gear 6 to descend through said conduit 25 which is slightly offset with respect to boiling-water supply tube 5a and with respect to the vertical plane of symmetry of said boss 6c, passing through the two axes of said grinding screw and said centrifuging chamber 23 at the level of a circumferential part of this chamber which is practically dry and no longer covered with residue.

The original material so introduced is exposed to the water issuing from supply tube 5a and rapidly passes through it under the influence of centrifugal force and then between superposed crowns which are of lesser heights at the outside, then through slots 26 separating posts 26a joining the upper part of said chamber 23 to a lower collar 23a allowing its fixation to said planetary gear.

After crossing the center part of maximum diameter and of relatively reduced thickness of an outside wall 27 of said planetary gear, the infusion leaves at the level of orifices 27a, one of which is shown in FIG. 2.

A fixed annular element 28 surrounds said planetary gear and comprises a drain 28a at its lower part, at least one infusion descent tube 29 starting from said drain. This element 28 may be locked-in at the desired height by means of a bracket 30 and a locking collar 31 operating in concert with said column 16 which also supports funnel 1 and grinding enclosure 1a by means of said collar 18 and a bracket 32.

The role of the conical deflecting boss 6c will presently be explained in greater detail.

From supply tube 25 the residue is constantly thrown against inside wall 33a of the various superposed crowns 33 which make up the filter and are driven by the slow rotational motion of said centrifuging chamber and the filter contained therein towards that part of the filter nearest the grinding screw under the combined effect of the centrifugal force due to the high speed rotation of the planetary gear and of the low-speed motion of said centrifuging chamber.

This part of the filter is denoted in FIG. 2 by reference numeral 33b.

The deflecting boss 6c imparts to the residue an appropriate shape when it is driven against the inside wall of the filter seated in said centrifuging chamber.

Thus, it is essentially by the combined action of the centrifugal force and low rotational speed of chamber 23 that the residue after having provided its essence to the infusion will be moved back to the vicinity of the shaft fixed to screw 2 where it is first detached by a cylindrical scraper shown at 34 in FIG. 2 which sends it toward helical ramps 35 fastened to a fixed sleeve 36 surrounding screw 2 so that it will descend by gravity along these ramps 35 into an element 37 acting as a turbine, from where the residue is expelled by vanes 6b fastened to the lower part of said planetary gear into a conduit 38 shown in FIG. 1 and then led into a suitable collecting vessel.

It will be noted from FIGS. 1 and 2 that the lower part of fixed sleeve 36 forms a shoulder 9 supporting said rotation-drive pinion 7 of said planetary gear by means of a bearing 40 of which the lower part is also shown in FIG. 1.

This shoulder 39 is supported in turn by a saddle consisting of a horizontal shaft 41 mounted on two brackets 42 resting on a plate 43 which supports the drive motor 10 for the planetary gear and for the grinding screw, and also the lower ball-bearing stop 14 of said grinding screw.

Pinions 20 and 22 and shaft 19 are mounted on planetary gear 6a by means of a lower shoulder of said shaft 19 and of a fastening saddle 44 fixed to the upper part of planetary gear 6a also supporting the upper part 6 of said gear.

One will note the difficulties in transmitting the various motions generated by motor 10 to the various rotating parts, in particular to the eccentric centrifuging chamber through the intermediary of crown 24 despite the presence of the fixed sleeve 36 of shoulder 9 and of bearing 40.

The four fixed components consisting of the grinding enclosure and the funnel above the latter, element 28 and its drain 28a, enclosure 37 of residue expulsion turbine, and lastly plate-support 43, are separated from one another and are joined only through column 16 and through supports 41, 42.

The filter operation inside centrifuging chamber 23, 23a will now be explained:

As already stated, the connecting posts between the upper and lower parts 23 and 23a respectively of said centrifuging chamber are of a very slight inside conical contour so that, during the rotations of the planetary gear and of said centrifuging chamber, they may induce in continuous manner relative displacements between the various superposed crowns.

As already stated, these various crowns achieve only slight radial contact surfaces with the adjacent crowns which enclose them.

The total vertical clearance left between the various superposed crowns, that is the clearance corresponding to the difference between the total thickness of these crowns and the height of said connecting posts, is so selected as to be less than the minimum dimensions of the grains of the ground material supplied by the grinder integrated in said machine, so that when the various superposed crowns move relatively to each other, the infusion will be capable of passing between these crowns through the clearance so obtained between these crowns, without the finest particles of the ground material being drained away with the infusion.

Furthermore, these relative displacements of the contact surfaces between adjacent crowns provides and ensures self-cleaning of the filter, a feature which does not exist in conventional-type filters, particularly not in those of perforated sheet metal or of wire gauze, which always tend to clog. This does not occur in the filter of the application in which the relative motions caused by the slight conicity of said connecting posts ensure self-cleaning that was found absolutely effective.

It should be noted that the new infusion machine comprises in a known manner a system allowing factory-adjustment of the fineness of the residue by displacing the grinding enclosure of said grinder with respect to the threads of said grinding screw.

This system is shown diagrammatically in FIG. 2 in the form of a knurled knob 45 fastened to a threaded rod 45a of which the position with respect to the upper part of a casing 46 surrounding with its lower part the grinding enclosure may be locked by a nut and lock-nut.

Said casing 46 in particular comprises connecting posts 46a linking said upper and lower parts allowing the original material to pass between them from funnel 1 toward the grinding enclosure 1a below.

FIG. 8 shows crowns 47 with a cross-section similar to that of crowns 33 shown in FIG. 7, but comprising bosses 47a from place to place and preferably equidistantly on their upper part, the upper horizontal level of these bosses being flush with that of the corresponding crown.

The profile of the boss of the upper crown is shown in solid lines; the boss is located behind the cross-sectional plane of FIG. 8, whereas boss 47a of the lower crown, for which the contour is shown in dash-dot lines, is located in front of said plane.

Bosses 47a are particularly clearly shown in FIG. 10. They serve to maintain in the horizontal position the adjacent crown which is found just above them when the horizontal sides of slight dimensions, as shown at 47b and 47c in FIGS. 8 and 9, are sufficiently offset with respect to each other to give space between them and in the gaps separating bosses 47a to clearances such as the one shown at 48 in FIG. 9. These clearances are of small dimensions, less than that of the solid particles which should be trapped at those sites where an infusion, or, more generally, a filtrate may on the contrary pass between two superposed adjacent crowns.

As stated above, before post 26b shown schematically in both FIGS. 8 and 9 is returned to the vertical position, these clearances are eliminated, even between said bosses 47a, the moment the horizontal sides 47b and 47c of two superposed adjacent crowns in FIG. 9 do straddle each other, that is, when the outer point 50 of the upper horizontal side 47b of the lower crown reaches the level of internal point 49 of the horizontal lower side 47c of the adjacent crown superposed to the first one.

It will be furthermore seen from FIG. 11 that the lower collar 23a of centrifuging chamber 23 is replaced by a collar 23b in conformity with the improvements discussed above and fastened from place to place by fixed posts 26b in the shape of a U-channel and inclined to the vertical, rods 52 inside the posts being capable of pivoting about shafts 51 housed in the lower part of said posts 26b. These rods 52, if desired, may be of a semicircular profile on the side facing said channels 26b which allows seating them more or less high inside said channels.

These rods 52 are shown in solid lines and in a theoretical vertical position for which there is no play at all left between the superposed crowns 47, so that no filtrate may be expelled, nor can there by any epicycloidal motion of said crowns.

An explanation will presently be provided for the adjustment of the inclination of rods 52 and the degree of fineness of the solid particles likely to be carried along when said filtrate is expelled under centrifugal action.

Springs 53 are mounted inside channels 26b to return rods 52 to the vertical position.

However, drive crown 24 shown in FIGS. 2, 4 and 7 is replaced by a crown 54 comprising a part at right-angle to it and threaded at the outside at 56, this thread operating in concert with the inside one of an annulus 57, also shown in dash-dot lines at 57a in such a position that a flank 58 provided at the lower part of said annulus 57 occupies a lower position, also shown in dash-dot lines at 58a, the descent of said flank 58 forces rods 52 to progressively incline towards the sloping position shown at 52a in dash-dot lines in FIG. 11. Spring 53 then will be compressed into a position shown in dash-dot lines at 53a.

It is to be understood of course that because of crown 54 driving the centrifuging chamber and because of the double rotary motion imparted to the chamber, adjustment of the height of annulus 57 by screwing or unscrewing is only feasible after removing the various connecting screws 59 locking the upper part forming the cover of the centrifuging chamber 23 into rotation with said crown 54 and with said annulus 60 located below said crown and itself locked to the upper part of channels 26b.

Therefore, once the upper part of the filter has been disassembled, the height of annulus 57 may be adjusted with respect to crown 54 and to its right-angle extension 55 by forcing said elements 52 to progressively slope and by allowing crowns 47 to execute motions of increasing amplitudes as far as the positions shown in dash-dot lines at 47d in FIG. 11.

The drawing omits the speed-changing system allowing correlative variations of the speed of rotation of the planetary gear and that of the centrifuging chamber 23, such systems being known and easily made available to the user who can also vary the positions of annulus 57 and extension 55 of crown 54 to impart at any time the optimum inclination to the posts of the centrifuging chamber that corresponds to a given expulsion rate of the filtrate and to the desired degree of filtering.

It is self-evident that when disassembling the centrifuging chamber which constitutes the filter proper, it is possible to change crown 54 so as to vary the ratio between the rotary speed of the filter and that of the planetary gear, to obtain in such manner a constant concentration of solid particles of the suspension which is present at any time in the filter regardless of the extent of filtering required.

Again, two distinct asynchronous types of motors may be provided to drive said planetary gear into rotation and to drive the filter, each motor being equipped with an electrical rotational-speed control.

It will of course be appreciated that the embodiment hereinbefore described has been given purely by way of example and may be modified as to detail without thereby departing from the basic principles of the invention.

What is claimed is:

1. In an infusion making machine comprising:

a rotatably mounted central shaft threaded near its upper end, a grinding chamber encircling said threaded part, and means for introducing a solid flavored material into said grinding chamber, the improvement which comprises:

planetary gearing encircling said shaft and means for rotating said gearing and said shaft, an eccentric, circular housing surrounding said shaft, and defining a centrifuging chamber, said housing being mounted to be driven by said gearing at a speed less than that of said shaft, means for leading a liquid and ground material from said grinding chamber into said centrifuging chamber, a self-cleaning filter on the inside of said centrifuging chamber, a scraper carried by said gearing for removing residue from said filter, and means for leading said residue and an infusion separately from said machine.

2. Infusion-making machine as defined in claim 1, in which said thread is of downwardly decreasing pitch and depth and cooperates with said grinding chamber wall to form a grinder integrated into the upper part of said machine.

3. Infusion-making machine as defined by claim 2, in which said central shaft is supported at its lower end by a ball-bearing and at its upper end by a support fastened to a supply funnel for said grinding chamber.

4. Infusion-making machine as defined in claim 3, in which said support comprises circumferential slots allowing said material to pass freely under the action of gravity from said supply funnel to said grinding chamber and terminating at its lower part into a helical ramp capable of pushing the ground material into said means for leading ground material to said centrifuging chamber, said planetary gear has an upper part comprising at its periphery a collecting drain the outside of which is in the shape of a truncated cone and which receives boiling water through tubing from a fixed vessel mounted on the same plate as said supply funnel and ensuring pressurization of this boiling water and its guidance toward said centrifuging chamber, and said planetary gear comprises a lower part held at a given height with respect to another element of this planetary gear by means of a saddle rigidly fastened to the upper part of said other element and also maintaining in place the shaft of said speed-reducer.

5. Infusion-making machine as defined in claim 4, in which the upper part of the planetary gear is equipped with two outlet ducts, one for the ground material and the other for the boiling water, respectively connected to a central cavity and to said collecting drain, and entering said central cavity of said centrifuging chamber at a slight angle to each other, the ground material arriving in this chamber before the boiling water into which it will be infused by centrifugation, and said two ducts being parallel and inclined to a conical part of the cover of said centrifuging chamber, said cover being next to said toothed crown, and being located in front of the vertical plane of symmetry of said deflecting boss with respect to the direction of rotation of said planetary gear.

6. Infusion-making machine as defined in claim 1, in which said thread is the constant-pitch thread of an Archimedean screw supplying said solid material to said machine.

7. Infusion-making machine as defined in claim 1, in which the part of said planetary gear holding said eccentric circular housing is provided with a deflecting cylindrical-conical boss coaxial with said centrifuging chamber, the top of said deflecting boss being crescent-shaped and supporting the lower surface of the ring of residue obtained by centrifuging against the wall of said filter.

8. Infusion-making machine as defined in claim 7, in which said deflecting boss comprises an exit ramp for said residue at one of the ends of said crescent.

9. Infusion-making machine as defined in claim 8, comprising a thin cylindrical-conical element which is solidly connected to said scraper and which is interrupted on the side opposite to that of said centrifuging chamber shaft to permit the escape of the residue.

10. Infusion-making machine as defined in claim 1, in which:

said housing comprises a circumferential toothed crown gear driven through a speed-reducer mounted on a shaft which rotates with said planetary gear but is capable of rotating with respect to said planetary gear, said speed-reducer comprising two superposed pinions, one of which is controlled by a pinion ganged to said central shaft and the other of which operates in concert with said toothed crown gear.

11. Infusion-making machine as defined in claim 1, comprising a stationary ring surrounding said planetary gear and held at a suitable level on an eccentric column by a bracket solidly fastened to a locking collar, and comprising at its lower part a circular channel collecting the infusion expelled from said centrifuging chamber, said planetary gear being provided at the level of the center part of said housing for the centrifuging chamber and to one side thereof with a wall of minimum thickness perforated with transmission holes for said infusion.

12. Infusion-making machine as defined by claim 1, in which a sleeve having inclined ramps separates said planetary gear from said central shaft and a pinion driving said planetary gear is mounted by a bearing on a lower shoulder of said sleeve and kept at the desired height by means of a saddle resting on a lower plate supporting both the lower part of said central shaft and a motor driving said shaft and said planetary gear.

13. Infusion-making machine as defined in claim 1, in which:

said filter consists of a stack of similar, annular, horizontal rings capable of contacting neighboring rings only on surfaces of very small radial dimensions, clearances being provided between said rings which are less than the minimum dimensions of the ground material introduced into said centrifuging chamber.

14. Machine as claimed in claim 13 in which the inside wall of said centrifuging chamber has a very slightly conical profile to ensure continuous displacements of slight amplitude of the rings of said stack with respect to each other, said displacements being horizontal and of sufficient amplitude to ensure self-cleaning of said filter but of insufficient amplitude to permit the residue to be carried between neighboring annular rings.

15. An improved filter adapted to be incorporated into the machine defined by claim 13, said improved filter comprising a plurality of superposed rings so mounted as to allow relative displacement with respect to each other to a sufficient extent to achieve on at least part of the surfaces contacting surfaces of neighboring rings a clearance of a given magnitude which permits passage of the filtrate but is capable of preventing any solid particles larger than this clearance from passing through the filter.

16. Improved filter as defined in claim 15, characterized by:

said superposed rings having upper frusto-conical parts with bosses in the shape of a stairway and with their tops flush with the level of the upper horizontal sides of said rings during motions imparted to these rings because of the inclination of the wall of said centrifuging chamber, and said filtrate clearance, which is a function of said inclination, being limited to those parts of said superposed crowns which are located between the bosses of the lower ring.

17. An improved filter as defined by claim 16, in which the circumferential outer surfaces of said superposed rings are roughened to oppose any sliding or slippage likely to degrade the self-cleaning obtained by the friction between superposed rings which are subjected to relative motions of different amplitudes.

18. Improved filter as defined in claim 17, in which the upper and lower horizontal sides of said ring and the upper parts of said stairway bosses are buffed to a maximum so as to facilitate the above cited relative motions of self-cleaning.

19. Improved filter as claimed in claim 18, having a circumferential driving ring provided with an annulus that may be adjusted with respect to its height and which comprises at its lower part a frusto-conical flank permitting the inclination of posts connecting said rings to be set with respect to the vertical against the action of flat springs housed inside fixed channels within which said posts may pivot about shafts provided at the lower part of said channels, and henceforth permitting the adjustment of the magnitude of said clearance.

20. Improved filter as defined in claim 18, in which said filter is equipped with several circumferential, interchangeable drive rings permitting arbitrary modification of the ratio of the rates of expulsion of the filtrate and of the solid particles contained in the suspensions to be filtered as a function of the filtering that is desired, of the smallest solid particles that are desired to be stopped, and of the above-cited expulsion rate of the filtrate, while keeping constant the content in solid particles of the solution present at any time in said centrifuging chamber.

* * * * *